March 31, 1970 M. HAINAULT 3,504,179
DIAGNOSTIC X-RAY TABLE HAVING A TILTABLE SURFACE MADE
OF A PLURALITY OF CONNECTED SECTIONS
Filed Oct. 6, 1964 5 Sheets-Sheet 1
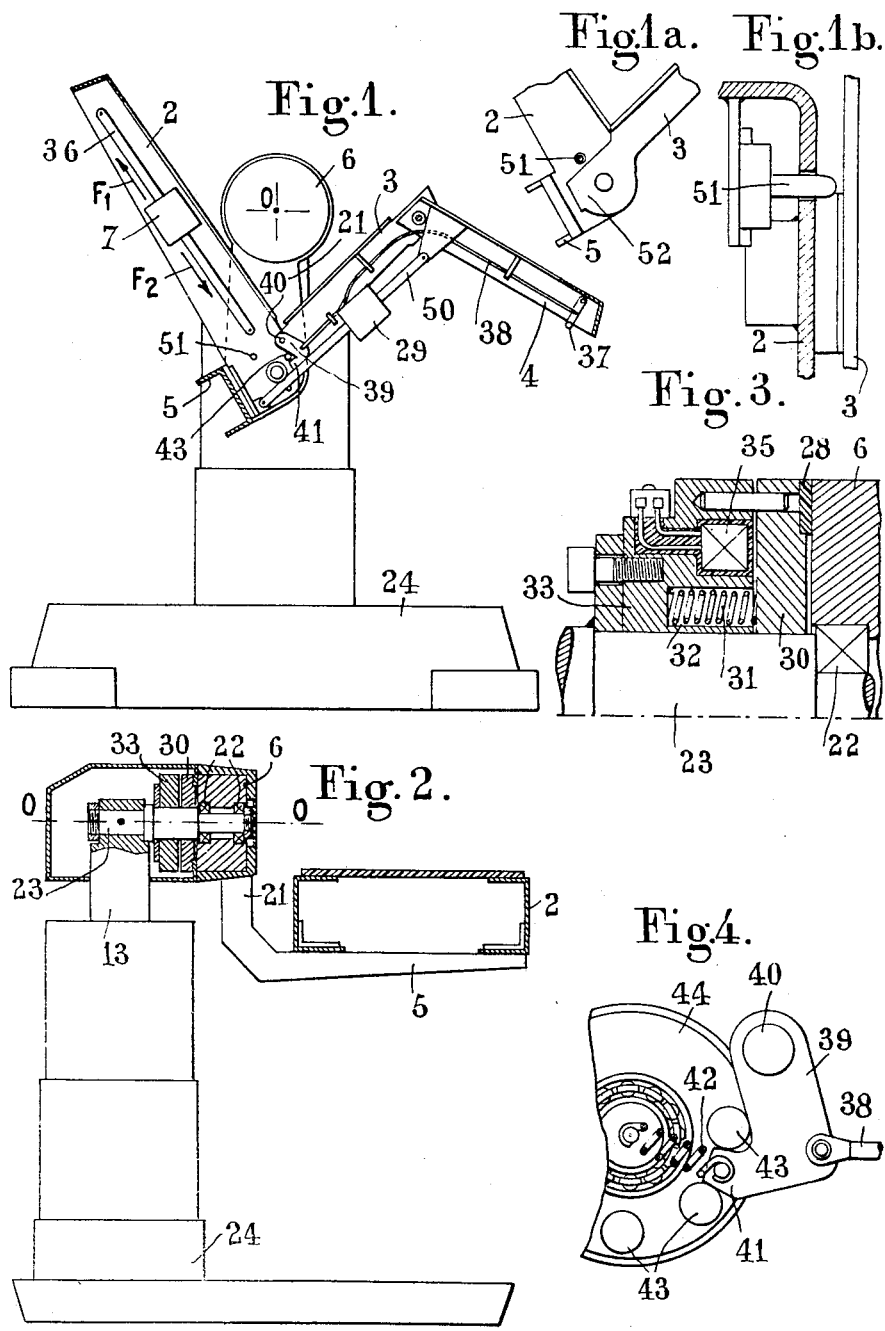

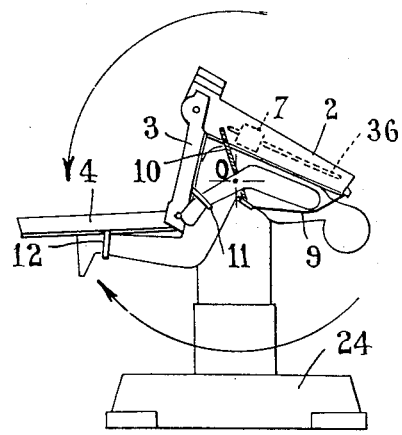
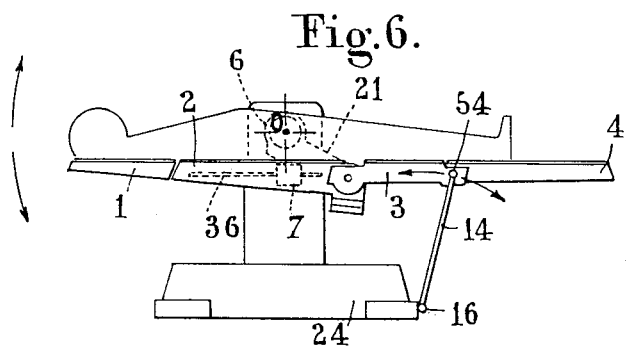
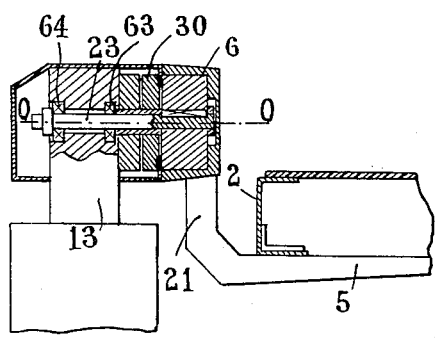
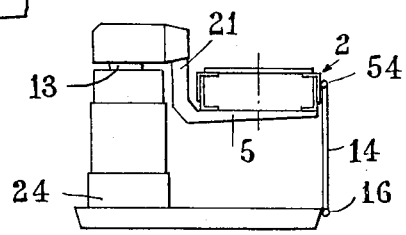

March 31, 1970  M. HAINAULT  3,504,179
DIAGNOSTIC X-RAY TABLE HAVING A TILTABLE SURFACE MADE
OF A PLURALITY OF CONNECTED SECTIONS
Filed Oct. 6, 1964  5 Sheets-Sheet 3
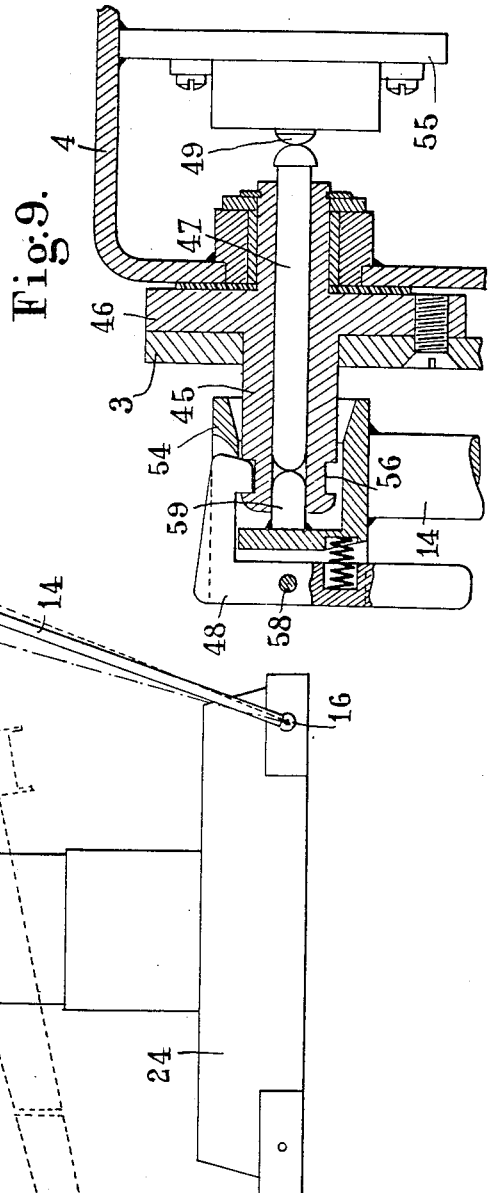
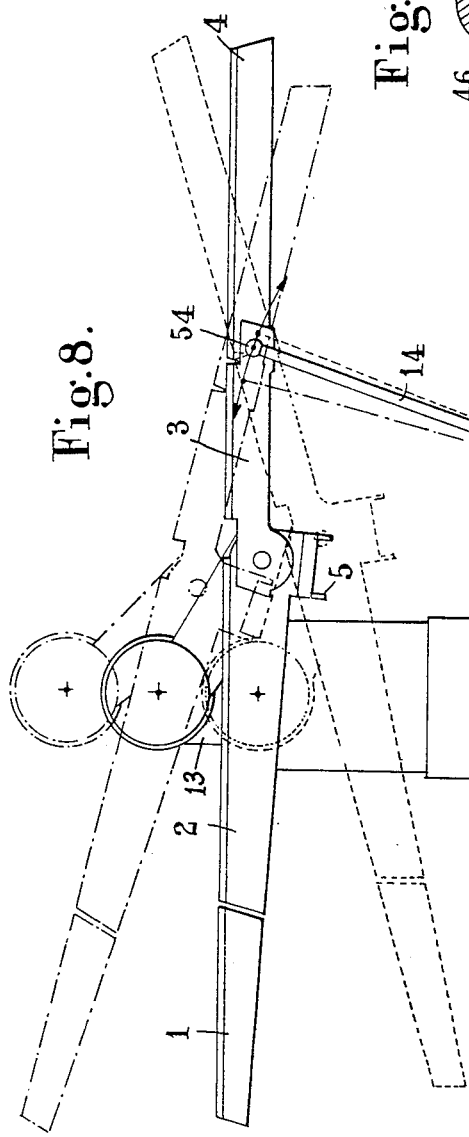

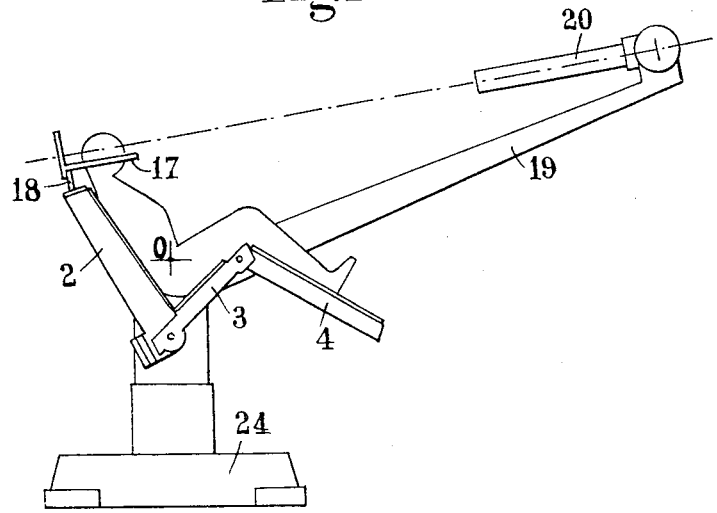
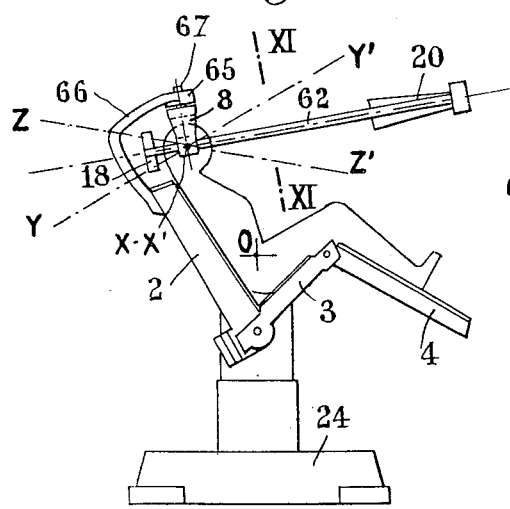
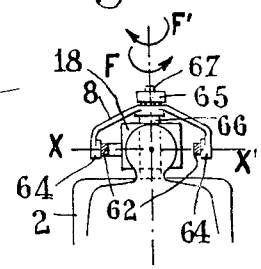

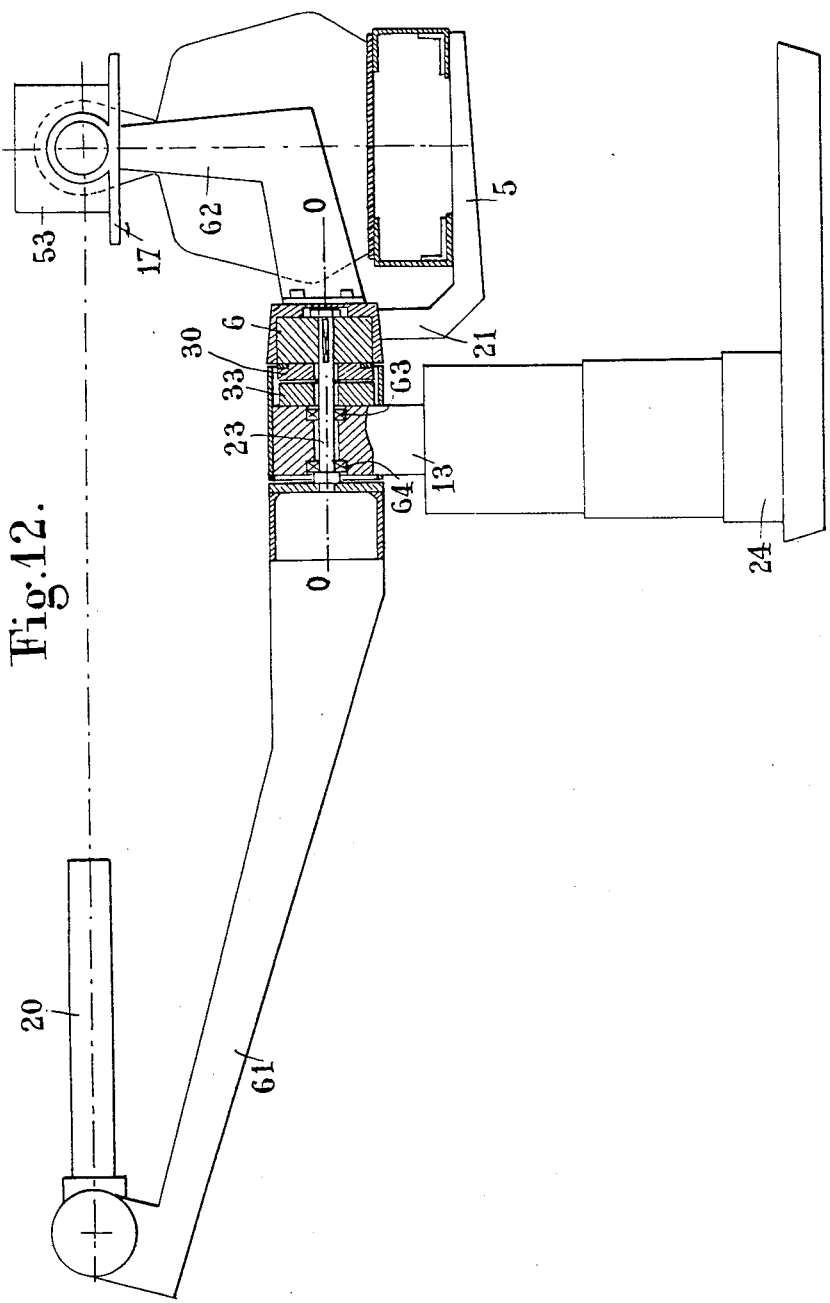

United States Patent Office 3,504,179
Patented Mar. 31, 1970

3,504,179
DIAGNOSTIC X-RAY TABLE HAVING A TILTABLE SURFACE MADE OF A PLURALITY OF CONNECTED SECTIONS
Marcel Hainault, Romainville, France, assignor to Alexandre & Cie, Societe Anonyme, Romainville, France
Filed Oct. 6, 1964, Ser. No. 401,799
Claims priority, application France, Oct. 8, 1963, 949,911
Int. Cl. G01n 23/00; H01j 37/20
U.S. Cl. 250—55                                    1 Claim This invention relates to diagnostic or examination X-ray tables and has specific reference to tables of this character which consist of hingedly interconnected plate elements adapted to be set in predetemined relative angular positions as required for the patient's positions contemplated. These plate elements are pervious to X-rays and supported as a rule by a stand adjustable in the vertical direction either by means of a pedal-controlled hydraulic system or by means of an electromotor.

It is the essential object of this invention to provide a hinged table of this character which is intended more particularly for encephalographic, myelographic and teleradiographic examinations, with or without the use of contrasting substances, which involve considerable changes in the patient's position between successive exposures.

This invention is also concerned with a diagnostic or examining X-ray table combined with support means for the X-ray apparatus which follow the movements of said hingedly interconnected plate elements during their movements.

The plates constituting the hinged table are hingedly interconnected in such a manner as to make it possible to convert the table into a seat while preserving the equilibrium of the assembly.

To this end the table is mounted in overhanging relationship on a bracket carried by an arm adapted to revolve through 360° about a spindle coincident with the mean center of gravity of the assembly comprising the patient and the plate elements of the table.

The spindle of said pivoted arm is supported in turn by a vertically adjustable stand warranting the maximum stability to the assembly.

Means are also provided for locking at will the pivoted arm in the selected angular position, together with means for locking the hinge means of said plate elements with one another according to their relative inclination necessary for the X-ray examination.

In certain forms of embodiment of the diagnostic X-ray table of this invention the X-ray apparatus or units are carried by brackets or other support means also pivotally mounted on the spindle of the telescopic stand so that they can be set in all the positions corresponding to the table positions.

Other features and advantages of this invention will appear as the following description proceeds with reference to the accompanying drawings illustrating diagrammatically by way of example typical forms of embodiment of various constructional details of the diagnostic X-ray table according to this invention. In the drawings:

FIGURE 1 is a side elevational view of the table in its seat-forming position;

FIGURES 1a and 1b are detail views showing hinge means associated with the plates;

FIGURE 2 is an end view with parts shown in cross-section;

FIGURE 2a is a view showing an alternate form of embodiment corresponding to FIGURE 2;

FIGURE 3 is a section showing on a larger scale a detail of the assembly of FIGURE 2;

FIGURE 4 is a detail view showing on a larger scale the plate hinge and detent-positioning means;

FIGURE 5 is a view similar to FIGURE 1 showing the permissible table tilting movement;

FIGURE 6 is a side elevational view showing the means for anchoring the table to the base when the table is in its horizontal position;

FIGURE 7 is an end view corresponding to FIGURE 6;

FIGURE 8 is a view similar to FIGURE 6 showing on a larger scale the permissible table tilting movements with the elements aligned for effecting a myelographic examination;

FIGURE 9 is a section showing on a larger scale the means for locking the table prop bar in the selected position;

FIGURE 10 is a side elevational view showing the table set for effecting an encephalographic examination;

FIGURE 11 is a similar view for effecting an encephalographic examination;

FIGURE 11a is a fragmentary sectional view taken upon the line XI—XI of FIGURE 11; and FIGURE 12 is a part-sectional elevational view showing a teleradiographic examining arrangement utilizing the mounting of FIGURE 2a.

The table according to this invention comprises in the known fashion a plurality of adjacent elements or plates 1, 2, 3 and 4 pervious to X-rays and hingedly interconnected so that they can be set in any desired mutual angular positions, notably in a seat position shown in FIGURE 1.

The assembly comprising these elements 1 to 4 is supported in overhanging relationship by a bracket 5 (FIGURE 2) mounted on the end of a supporting arm 21 rigid with a drum 6 having its axis O—O coincident with the mean center of gravity of the assembly consisting of the patient, on the one hand, and of the set of plates 1–4 on the other hand.

This drum 6 is journalled on rolling-contact bearings 22 carried by a fixed horizontal spindle 23 mounted in overhanging relationship on the vertical telescopic pintle 13 carried in turn by the fixed stand 24.

Means are provided on said spindle 23 for braking and locking the drum 6 and therefore the table against rotation.

According to an alternate form of embodiment of this invention illustrated more particularly in FIGURE 2a of the drawings, the spindle 23 is adapted to revolve freely and guided in fixed rolling-contact bearings 63, 64 fitted in a horizontal bore formed in said telescopic pintle 13 engageable by the braking disc 30.

As clearly shown in FIGURE 3, the drum 6 may be braked by means of friction linings 28 carried by the outer peripheral portion of a disc 30 held against rotation and constantly urged to its braking position by spring means 31 housed in recesses 32 of a fixed member 33. An electro-magnet 35 is adapted when energized to attract the disc 30 and thus release the drum 6.

Since the position of equilibrium varies as a function of the weight of each patient, a balance-weight 7 is adapted to slide along a rod 36 carried by the element or plate 2, for example in the direction of the arrow $F_1$ or $F_2$, and another balance-weight 29 is adapted to slide along the connecting rod 50 mounted on elements 3 and 4 of the table, with a view to restore or substantially restore at any time the coincidence between the axis of rotation O—O and the mean center of gravity of the assembly consisting of the patent and of the table elements. At the same time the table can be rotated to assume for instance the position shown in FIGURE 5.

When the proper balance has been achieved, the electromagnet 35 is de-energized and the spring means 31 will cause the drum 6 and therefore the bracket arm 5 to be again held against movement.

The patient is attached on the table by means of straps 9, 10 and collars 11, 12 adapted firmly to hold the patient irrespective of the position in which he or she may be moved for diagnostic or examining purposes.

The means for controlling the electromagnet 35 consist essentially of a push-button switch 51 mounted on plate 2, for instance, this control switch being protected against any untimely actuation when it is concealed by the side member 52 of element 3 aligned with respect to this element 2 (see FIGURES 1a and 1b).

The hinged means interconnecting the plate elements 1–4 are adapted to be locked in the manner illustrated in FIGURE 4 by means of a detent-positioning device comprising a control level 37 fulcrumed on the outer end of element 4 and connected for example to one end of a flexible control cable 38 for example of the Bowden type having its opposite end attached to the elbow of a cranked lever 39 having one arm pivoted on a fixed pin 40 and the other arm formed with a pawl-shaped end 41 adapted resiliently to engage, against the resistance of a tension spring 42, the gap formed between a pair of adjacent studs 43 carried by a disc 44 of the hinge means.

In the case of a myelographic examination (see FIGURE 6) the table elements 1–4 are aligned to provide a continuous top surface and the electromagnet control switch 51 is concealed. The hinge means interconnecting the plates 1–4 are locked against motion and thus the table may assume any desired position within the limits set by the end positions shown in broken lines and chain-dotted lines in FIGURE 8.

For properly balancing the table and directing its variable inclination, a device consisting of a prop bar 14 pivoted at one end on the base plate 24 by means of a ball-and-socket joint 16 and at its other end on the end element 3 is used.

As shown on a larger scale in FIGURE 9 the side members or flanges of elements 3 and 4 are pivotally interconnected by means of a socket 45 rigid with an intermediate flange 46 in which a push member 47 is slidably fitted. This push-member 47 engages a push-button 49 for actuating a contact carried by a base plate or lug 55 rigid with said table element 3 for closing the circuit controlling the electromagnetic locking device.

A bell-crank lever 48 fulcrumed on a pin 58 has a hook-shaped projection resiliently engaged in a groove 56 of said socket 45; this lever is adapted to push a central stud 49 for closing the contact by means of the push member 47. This lever is secured on the end portion 54 of the prop rod 14 so that the table alignment may be preserved while supporting same during its rotation about the socket 45 which is effected by using the conventional means controlling the telescopic pintle 13; once the prop bar 14 has been positioned the table elements are locked with respect to one another and by lifting the pintle 13 the table is given the desired inclination as shown in FIGURE 8.

FIGURE 10 illustrates the table disposal for an encephalographic X-ray examination. The focus of the X-ray tube 20 is located on and supported by an arm 19 and the patient-and-table assembly together with the radiography unit 53 (FIGURE 12) is rotatably movable about the axis O—O.

FIGURES 11 and 11a illustrate a table arranged for an encephalographic X-ray examination. Secured on the back of element 2 for example is a bracket 66 carrying on its end a bearing 65 overlying substantially the patient's head and receiving a pivot pin 67 for mounting a yoke 8 of which both arms on either side of the patient's head terminate with fulcrum means for two rods 62 carrying in turn at one end the X-ray cassette 18 and at the other end the X-ray generator 20.

Thus, by rotating the rods 62 about their bearings on bow 63 the axis X–X' of the X-ray beam may be inclined between the angular limits Y–Y' and Z–Z'; alternately, the assembly may be rotated about the patient by rotating the pivot pin 67 in bearing 65 in one or the other direction as shown by the arrows F, $F_1$.

When it is desired to use the table of this invention for a teleradiographic X-ray examination, the patient's head is held in the frame 17 supported by plate 2 by means of a support 18. Rigid supporting members 19 maintain the orientation of the X-ray tube 20 perfectly perpendicular to the plane of said frame, and on the other hand the tube 20 is kept at the proper distance for front teleradiographic examinations.

The same disposal may be provided for lateral teleradiographic examinations by means of an arm 61 and another arm 62 supporting the X-ray tube 20 and frame 17 respectively (FIGURE 12).

The assembly comprising the X-ray tube 20 and members 19, 61 extending at right angles to each other, on the one hand, and the patient and table, on the other hand, remains rotatably stationary with respect to the axis O—O.

In this specific form of embodiment the spindle 23 can revolve freely, for example in the manner shown in FIGURE 2a, and may be used as a pivot pin for the arm 21 of the support and for the members 19 and 61 carrying the X-ray apparatus.

This spindle or pivot pin 23 is locked together with the drum 6 by the operation of the electromagnet 35 or any other hand-controlled or hydraulic locking means.

What I claim is:

1. A table for X-ray diagnostic and stereotaxic surgery comprising a vertical stand having a telescopic pintle, a plurality of inclinable, X-ray pervious plate elements hingedly inter-connected in succession, means for locking the hinge means of the endmost plate elements and comprising a flexible cable housed under said plate elements, a locking pawl controlled by said cable and a plurality of studs carried by the hinge means of intermediate plate elements and engageable by said locking pawl, a bracket rigid with one of said plate elements, said bracket having an upturned end, a drum rigid with the upturned end of said bracket, a spindle secured in the horizontal position to the top of said telescopic pintle and substantially in line with the center of gravity of the loaded table, a bearing mounted on the outer end of said spindle and rigidly carrying the upturned end of said bracket, an electromagnetic brake mounted on said spindle in the vicinity of said drum and a push-button electrical switch control for energizing said brake, having its push-button disposed in the vicinity of the hinge means of said intermediate plate elements so as to be concealed by said plate elements in the aligned position thereof, at least two balance-weights slidably mounted along the sides of said plate elements for balancing the table, an X-ray generator tube, two rods for supporting said generator tube, an X-ray cassette mounted on the opposite ends of said two rods, a yoke having said two rods pivotally mounted at its two ends, a pivot pin carried by the top of said yoke, and a bracket rigidly mounted on the endmost plate element at the head of the table and carrying a bearing for said pivot pin.

References Cited

UNITED STATES PATENTS

| | | | |
|---|---|---|---|
| 1,871,005 | 8/1932 | Mutscheller et al. | 250—57 |
| 2,906,880 | 9/1959 | Stava et al. | 250—57 X |
| 3,141,972 | 7/1964 | Oller | 250—55 |

WILLIAM F. LINDQUIST, Primary Examiner